US011087130B2

(12) United States Patent
Liu et al.

(10) Patent No.: US 11,087,130 B2
(45) Date of Patent: Aug. 10, 2021

(54) SIMULTANEOUS OBJECT LOCALIZATION AND ATTRIBUTE CLASSIFICATION USING MULTITASK DEEP NEURAL NETWORKS (71) Applicant: RetailNext, Inc., San Jose, CA (US)

(72) Inventors: Dong Liu, Berkeley, CA (US); Imran Saleemi, San Jose, CA (US); Mark Jamtgaard, Mountain View, CA (US)

(73) Assignee: RetailNext, Inc., San Jose, CA (US)

( * ) Notice: Subject to any disclaimer, the term of this patent is extended or adjusted under 35 U.S.C. 154(b) by 129 days.

(21) Appl. No.: 16/233,030

(22) Filed: Dec. 26, 2018

(65) Prior Publication Data
US 2019/0205643 A1 Jul. 4, 2019

Related U.S. Application Data (60) Provisional application No. 62/612,021, filed on Dec. 29, 2017.

(51) Int. Cl.
*G06K 9/00* (2006.01)
*G06N 3/08* (2006.01)
(Continued)

(52) U.S. Cl.
CPC ..... *G06K 9/00624* (2013.01); *G06K 9/00335* (2013.01); *G06K 9/46* (2013.01); *G06K 9/628* (2013.01); *G06K 9/6217* (2013.01); *G06N 3/04* (2013.01); *G06N 3/08* (2013.01); *G06Q 30/0639* (2013.01); *G06T 7/246* (2017.01); *G06T 7/73* (2017.01); *G06T 2207/10012* (2013.01); *G06T 2207/10028* (2013.01);
(Continued)

(58) Field of Classification Search
None
See application file for complete search history.

(56) References Cited

U.S. PATENT DOCUMENTS

| 10,664,722 B1 * | 5/2020 | Sharma | G06K 9/6256 |
|---|---|---|---|
| 2018/0130324 A1 * | 5/2018 | Yu | G06K 9/00295 |
| 2019/0145765 A1 * | 5/2019 | Luo | G06K 9/6274 |
| | | | 702/153 |

OTHER PUBLICATIONS

Felzenszwalb et al., "Object detection with discriminatively trained part-based models." IEEE transactions on pattern analysis and machine intelligence, Sep. 2010, 32(9):1627-45.
(Continued)

*Primary Examiner* — Wei Wen Yang
(74) *Attorney, Agent, or Firm* — Fish & Richardson P.C.

(57) ABSTRACT

Various embodiments are disclosed for simultaneous object localization and attribute classification using multitask deep neural networks. In an embodiment, a method comprises: obtaining, by a processing circuit, an image from an image capture device in an environment, the image including a target object in the environment; generating, by the processing circuit, predictions from the image for the target object using a multitask deep neural network, the multitask deep neural network including a network trunk and side branches, the network trunk configured for multi-scale feature extraction guided by supervision information provided by the side branches during training of the multitask deep neural network, the side branches configured as learning task-specific classifiers; and using, by the processing circuit, the predictions to localize the target object in the environment and to classify the target object and at least one attribute of the target object.

25 Claims, 7 Drawing Sheets (51) Int. Cl.
     *G06T 7/73*       (2017.01)
     *G06K 9/62*       (2006.01)
     *G06K 9/46*       (2006.01)
     *G06T 7/246*      (2017.01)
     *G06Q 30/06*      (2012.01)
     *G06N 3/04*       (2006.01)

(52) U.S. Cl.
     CPC ............... *G06T 2207/20081* (2013.01); *G06T 2207/20084* (2013.01); *G06T 2207/30196* (2013.01); *G06T 2207/30242* (2013.01)

(56) References Cited

OTHER PUBLICATIONS

Liu et al., "SSD: Single shot multibox detector." European conference on computer vision, Oct. 8, 2016, pp. 21-37.
Howard et al., "MobileNets: Efficient Convolutional Neural Networks for Mobile Vision Application." Proceedings of Computer Vision and Pattern Recognition, Apr. 17, 2017, 9 pages.
Iandola et al., "Squeezenet: Alexnet-level accuracy with 50x fewer parameters and <0.5 mb model size." Proceeding of International Conference on Learning Representations, Feb. 24, 2016, 13 pages.
Szegedy et al, "Going Deeper with Convolutions," Proceedings of Computer Vision and Pattern Recognition, 2015, 9 pages.

* cited by examiner

SIMULTANEOUS OBJECT LOCALIZATION AND ATTRIBUTE CLASSIFICATION USING MULTITASK DEEP NEURAL NETWORKS

CROSS REFERENCE TO RELATED APPLICATIONS

This application is a non-provisional application of, and claims priority to, U.S. Provisional Patent Application No. 62/612,021, filed Dec. 29, 2017, for "A System and Method for Simultaneous Object Localization and Attribute Classification Using Multitask Deep Neural Networks in Retail Environments," the entire contents of which are hereby incorporated by reference.

TECHNICAL FIELD

The subject matter of this disclosure relates generally to detecting, tracking and counting objects of interest in videos.

BACKGROUND

In-store analytics is a collection of systems working together to organize, analyze, and visualize massive amounts of diverse retail data. One important function of these systems is to analyze the number and kinds of shoppers entering a store or passing by a particular location in a store to determine, for example, the potential buying power at that location. Shopper traffic counting also helps identify traffic cycles across the day, week, or year. Store owners can use the shopper traffic accounts to align staff and customer-to-staff ratios to hours with the most shopper visits by integrating workforce management with traffic data. Other advantages of in-store analytics systems include but are not limited to: automatic exclusion of store staff from traffic and isolation of employee paths to complete interaction analysis of sales associates and shoppers, identification of new versus repeat customers and determining visit frequency, duration, pass-by traffic and customer capture rate.

While there are solutions for anonymously tracking the movement of shoppers through a store, there are no scalable, low-cost solutions that detect shopper movement and shopper behavior. For example, shopper activities that are of interest to retailers include shoppers reaching into a shelf to pick up a product, examining a product after picking it up, or trying on a product such as a jacket, a headphone, or a shoe. Such data can be used to improve the shopper experience or understand why a specific product is not selling well. Retailers are also interested in detecting suspicious actions by shoppers such as sweeping large quantities of products off a shelf, hiding products underneath clothing, etc., and immediately alerting in-store personnel when such behavior is detected, and tag the relevant segments of video for subsequent examination and use as evidence.

In addition to shopper behavior, employee behavior is also of interest to retailers. For examples, retailers may want to know when employees are assisting customers, whether they are restocking shelves as items go out of stock, re-organizing displays when they get cluttered, or cleaning the store as per schedule.

SUMMARY

Various embodiments are disclosed for simultaneous object localization and attribute classification using multi-task deep neural networks. In an embodiment, a multitask deep neural network is used to localize targets of interest with bounding boxes, classify the targets into semantic categories and simultaneously predict attribute labels for each target. The advantage of the multitask deep neural network is that it jointly predicts many tasks in one unified lightweight network architecture to achieve real-time intelligent video analytics on, for example, embedded chips in a camera.

In an embodiment, a method comprises: obtaining, by a processing circuit, an image from an image capture device in an environment, the image including a target object in the environment; generating, by the processing circuit, predictions from the image for the target object using a multitask deep neural network, the multitask deep neural network including a network trunk and side branches, the network trunk configured for multi-scale feature extraction guided by supervision information provided by the side branches during training of the multitask deep neural network, the side branches configured as learning task-specific classifiers; and using, by the processing circuit, the predictions to localize the target object in the environment and to classify the target object and at least one attribute of the target object.

In an embodiment, a system comprises: one or more processors; memory storing instructions that when executed by the one or more processors, cause the one or more processors to perform operations comprising: obtaining an image from an image capture device in an environment, the image including a target object in the environment; generating predictions from the image for the target object using a multitask deep neural network, the multitask deep neural network including a network trunk and side branches, the network trunk configured for multi-scale feature extraction guided by supervision information provided by the side branches during training of the multitask deep neural network, the side branches configured as learning task-specific classifiers; and using the predictions to localize the target object in the environment and to classify the target object and at least one attribute of the target object.

Other embodiments are disclosed that are directed to systems and non-transitory, computer-readable storage mediums.

DETAILED DESCRIPTION

Example Retail Analytics Platform

Figure 1:
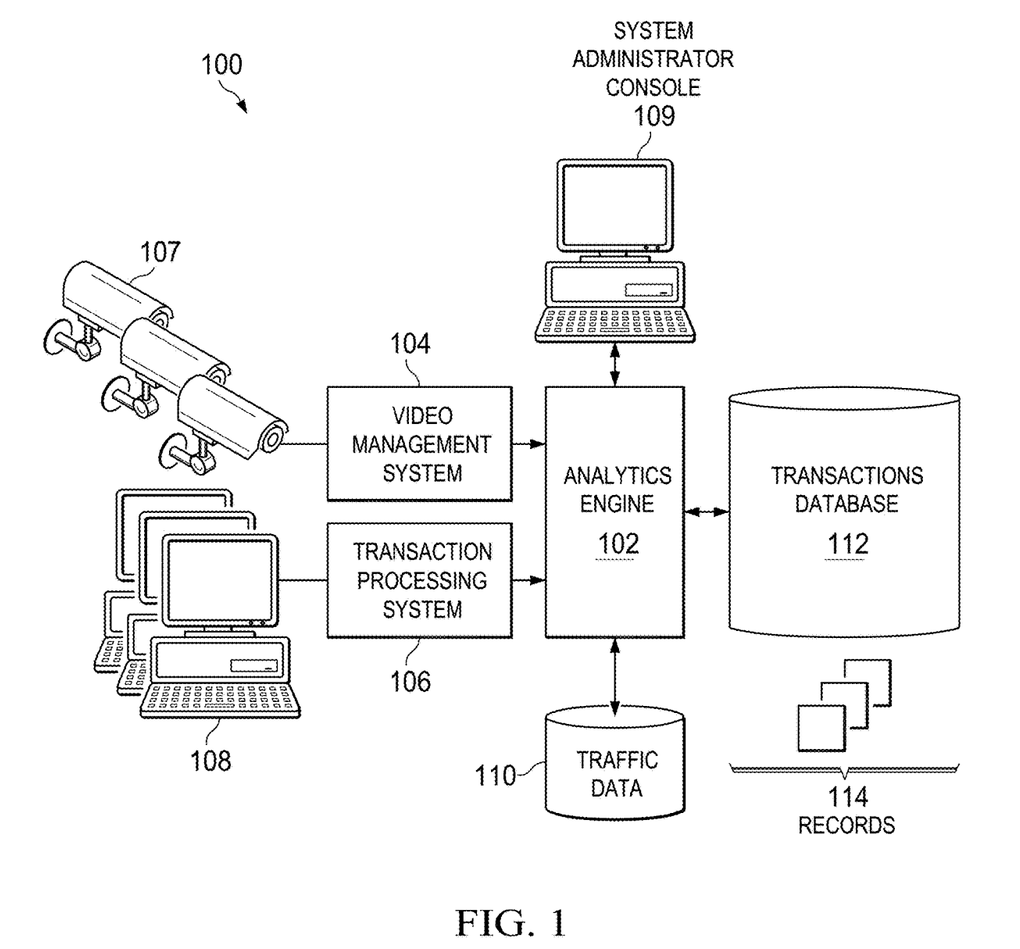
FIG. 1 illustrates an example retail analytics platform, according to an embodiment.

FIG. 1 illustrates an example retail analytics platform, according to an embodiment. System 100 includes analytics engine 102, video management system 104, transaction processing system 106, image capturing device(s) 107, transaction devices(s) 108 and system administrator console 109. Platform 100 can be used in any desired environment to perform data analytics including but not limited to tracking and counting objects of interest captured by image capturing device(s) (107). In the example that follows, platform 100 is deployed in a retail store and is used to track and count shoppers in the retail store so that traffic flow patterns can be discovered and used to improve retail analytics.

Image capturing device(s) 107 can be mounted on walls and/or ceilings at various locations throughout the retail store and directed toward transaction devices(s) 108, ingress and egress points and shopping aisles or any other desired location in the retail store. Capturing device(s) 107 can be monocular intensity cameras, stereo cameras, structured light cameras, time-of-flight (TOF) cameras or any other camera, sensor or system that is capable of capturing grayscale or color intensity images or depth images. As used herein, a depth image is an image that contains information relating to the distance of the surfaces of scene objects from a viewpoint. The image capturing device(s) 107 can include embedded processing chips that implement multitask deep neural network 304, described in reference to FIGS. 3-6.

Analytics engine 102 can include software, hardware and a combination of software and hardware. Analytics engine 102 takes as input video data from video management system 104, transaction data from transaction management system 106, traffic data from database 110 and transaction history from database 112. Database 110 stores traffic data (e.g., object tracks) associated with shopper traffic derived from videos, as described in further detail below.

Video management system 104 provides a physical interface for capturing device(s) 107. In an embodiment, video management system 104 includes computer hardware and software that implements system 200 for detecting, tracking and counting objects in depth images, as described in reference to FIG. 2. In another embodiment, video management system 104 includes computer hardware and software that implements a system for detecting, tracking and counting objects in grayscale or color images.

Transaction processing system 106 provides a physical interface for various transaction devices 108 (e.g., cash registers, computers, scanners) and software for implementing a set of policies, procedures designed to facilitate transactions. Database 112 stores transaction data in transaction records 114. Transaction data can include without limitation, transaction type (e.g., sale, refund, return), amount of transaction, time of transaction and identifiers for the employee who executed the transaction, the store and the transaction computer. The transaction data can also include video data, such as video data capturing a transaction at transaction device(s) 108.

A system administrator can use console 109 to analyze and display data, run search queries and generally facilitate user interaction with analytics engine 102 through a number of graphical user interfaces (GUIs) and input devices. Console 109 can be physically located at the point-of-sale (POS) and/or located remotely and coupled to analytics engine 102 through a network-based connection (e.g., in Internet or Intranet connection). Console 109 can be any device capable of providing a human interface to analytics engine 102, including but not limited to a desktop computer or mobile device (e.g., a tablet computer, smart phone).

Analytics engine 102 calculates statistical parameters (e.g., averages, medians, variances, standard deviations, quantiles) of various business activities (e.g., transactions) to identify patterns in data (e.g., patterns in transactions and video data). Analytics engine 102 can generate employee or customer profiles, perform time-series analysis of time-dependent data, perform clustering and classification to discover patterns and associations among groups of data, apply matching algorithms to detect anomalies in the behavior of transactions. The discovered data patterns and associations can be used for a variety of business purposes, including but not limited to: improving sales, marketing and customer service. In an embodiment, the discovered data patterns and associations can also be used to detect certain types of fraud at the POS, such as fraudulent refund transactions.

Example Object Tracking/Counting System

Figure 2:
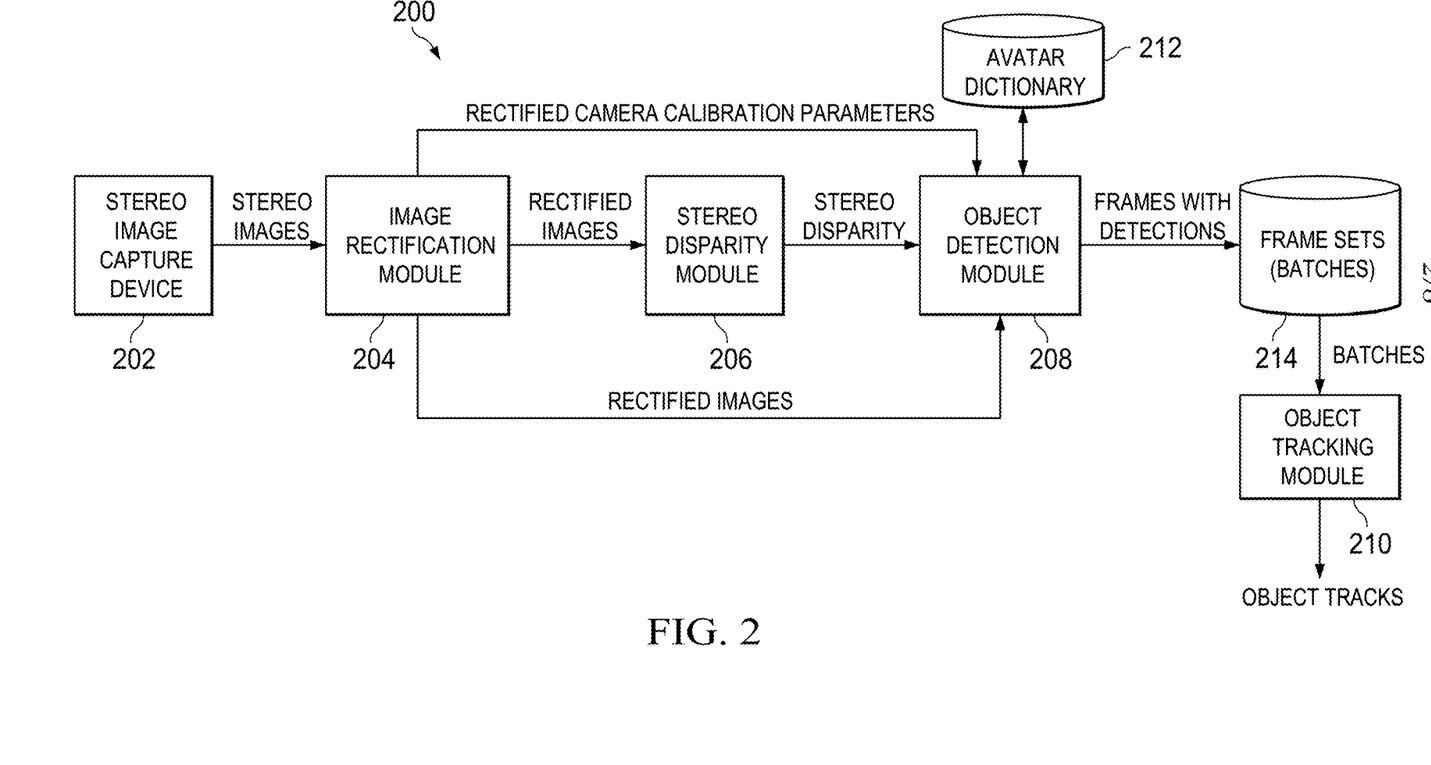
FIG. 2 illustrates an example system for detecting and tracking objects in depth images, according to an embodiment.

FIG. 2 illustrates an example system 200 for detecting and tracking objects of interest in depth images, according to an embodiment. System 200 includes stereo image capturing device(s) 202, image rectification module 204, stereo disparity module 206, object detection module 208, object tracking module 210 and avatar database 212 for storing an avatar dictionary. Although system 200 uses a stereo image camera for capturing depth images, other depth capturing devices can be used, such as structure light and time-of-flight (TOF) cameras. In an embodiment, system 200 can be implemented in video management system 104 described in reference to FIG. 1 and/or analytics engine 102.

Image rectification module 204 rectifies stereo images captured by stereo image capturing device(s) 202 using a projective transformation process that projects the stereo images onto a common image plane to simplify matching points (correspondence) between the stereo images. For example, image rectification module 204 can implement a known image rectification algorithm such as planar rectification, cylindrical rectification or polar rectification. Installation parameters (e.g., installed height and orientation of capturing device(s) 204) and calibration parameters (also called calibration coefficients) describing the alignment of stereo cameras are used to construct the image rectification transform. After rectification epipolar lines of the stereo images are parallel to a horizontal axis of an image coordinate system and corresponding points in the stereo images have identical vertical axis coordinates to facilitate correspondence between the stereo images.

After rectification, stereo (binocular) disparity module 206 scans the left and right images for matching image features. Stereo or binocular disparity refers to the difference in coordinates of similar features within two stereo images due to movement of the image capture device, the elapse of time, and/or movement of objects in the images. In an embodiment, the correspondence between left and right stereo images can be determined by forming a small image patch around every pixel in the left image. The image patches are then compared to all possible disparities in the right image by comparing their corresponding image patches. The comparison between these two patches can be made by obtaining a computational measure that compares each of the pixels in the patches.

The stereo disparity information output by stereo disparity module 206 is used by object detection module 208 to extract depth/distance information from the stereo images. Disparity and distance from the stereo image capture device is inversely related. As the distance from the device increases, the disparity decreases. This inverse relationship allows for depth perception in stereo images. Using geometry and algebra, the points that appear in the 2D stereo images can be mapped as coordinates in a 3D world coordinate system.

Object detection module 208 generates a dictionary of potential 2D projections of a 3D human model mimicking an average human. These projections correspond to an exhaustive set of potential locations in the world coordinate system that a human can occupy, and are realized as a discretized grid with adjacent locations at a pre-specified metric distance. The process of generating the dictionary of projections (hereinafter also referred to as "avatars") may receive as input: (i) specifications of a canonical human model in metric dimensions, and (ii) installation parameters, including ceiling height and two dimensions of rotation relative to the plane of installation that may be computed automatically using a stereo disparity based 3D point cloud and/or orientation sensors on board capturing device 202.

In an alternative embodiment, objects of interest can be detected and tracked in grayscale or color images. In case of grayscale or color monocular images, the image rectification and stereo disparity modules 204, 206 are not required. Instead, object detection module 208 operates directly on the input intensity image using one of several machine learning approaches. In one embodiment, potential objects are detected using a deformable parts model based approach, which has been trained on example instances of the same type of objects of interest, e.g., humans observed from a top down view, etc. An example of this approach is described in Felzenszwalb et al., "Object Detection with Discriminatively Trained Part-based Models." IEEE Transactions on Patter Analysis and Machine Intelligence, Vol. 32, No. 9 (September 2010), pp. 1627-1645, which publication is incorporated by reference herein in its entirety. The output of this first step for each input image is a set of bounding boxes along with scores that describe the confidence of the detector in observing an object of interest within the bounding box. The resulting bounding boxes are then compared against avatars (projections of canonical human models at a specific height and camera pose) to filter out unlikely locations, orientations, and scales.

In one embodiment, the deformable parts based approach is replaced with a deep convolutional neural network that simultaneously regresses to an optimal bounding box location and also classifies the region within the bounding box as one of the desired categories of objects of interest. The output of this process is also a set of bounding boxes each with a corresponding confidence score. An example of this approach is described in Liu Wei et al., "SSD: Single Shot Multibox Detector," European Conference on Computer Vision (ECCV), Springer International Publishing (2016), pp. 21-37, which publication is incorporated by reference herein in its entirety. This step is followed by a comparison against the avatar dictionary to remove false positive detections.

Simultaneous Object Localization and Attribute Classification

While system 200 provides a novel solution for anonymously detecting and tracking the movement of shoppers through a retail store, there is also a need to detect shopper behavior. For example, shopper behaviors that are of interest to retailers include shoppers reaching into a shelf to pick up a product, examining a product after picking it up, or trying on a product such as a jacket, a headphone, or a shoe. Such data can be used to improve the shopper experience or understand why a specific product is not selling well. Retailers are also interested in detecting suspicious actions by shoppers such as sweeping large quantities of products off a shelf, hiding products underneath clothing, etc., and immediately alerting in-store personnel when such behavior is detected, and tag the relevant segments of video for subsequent examination and use as evidence. In addition to shopper behavior, employee behavior is also of interest to retailers. For examples, retailers may want to know when employees are assisting customers, whether they are restocking shelves as items go out of stock, re-organizing displays when they get cluttered, or cleaning the store as per schedule.

Figure 3:
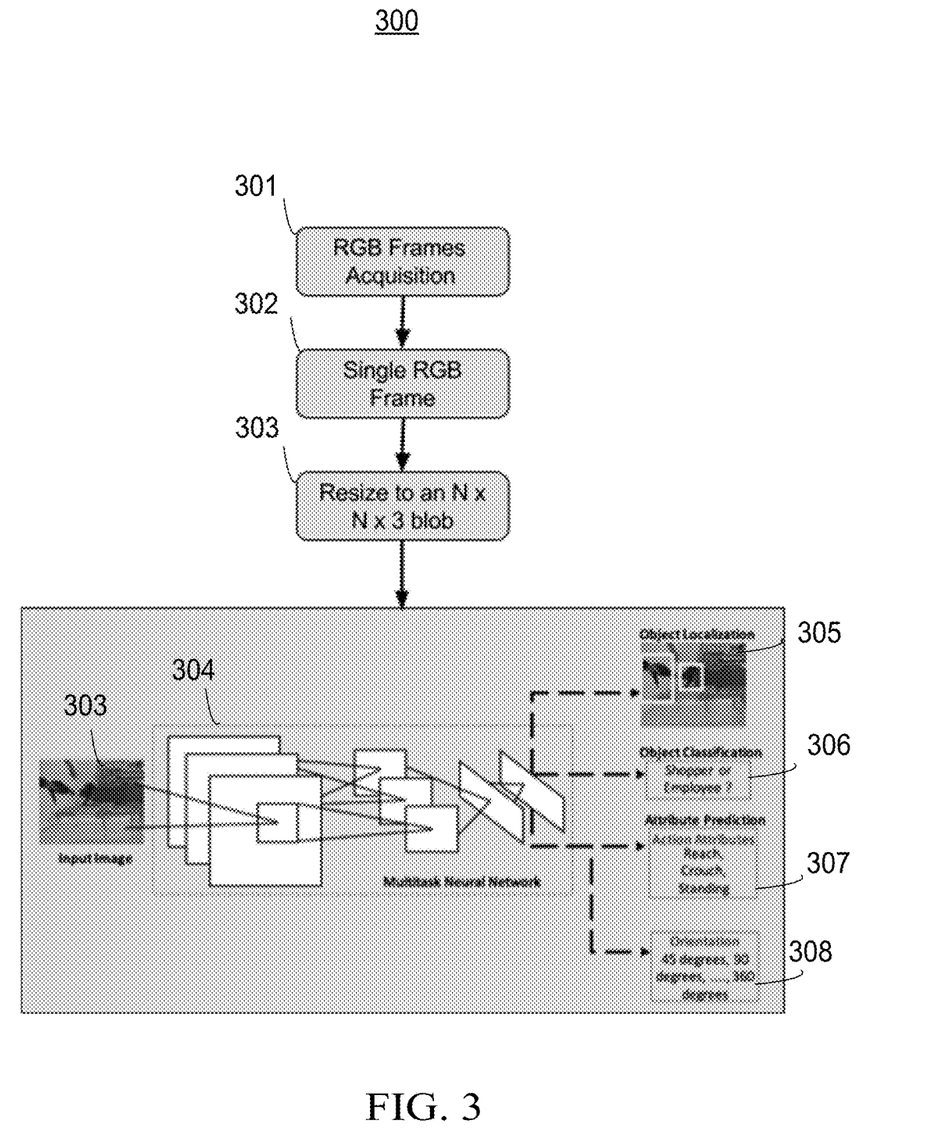
FIG. 3 illustrates a system for simultaneous object localization and attribute classification using multitask deep neural networks, according to an embodiment.

FIG. 3 illustrates a system 300 for simultaneous object localization and attribute classification using multitask deep neural network, according to an embodiment. System 300 improves upon system 200 by using multitask deep neural network to localize and classify the shopper and at least one attribute of the shopper.

System 300 includes frame acquisition module 301 that acquires images (e.g., RGB images) from a stereo or monocular camera. If stereo pairs, the frames are rectified based on calibration data and the images are generated as input in multitask deep neural network 304. Each single frame 302 is resized into a three-dimensional (3D) blob 303 (e.g., N×N×3 blob). The blob 303 (referred to hereafter as "input image 303") is fed into multitask deep neural network 304 which generates high-level semantic inferences. In an embodiment, the high-level semantic inferences can include but are not limited to: object localization 305, object classification 306, object attribute prediction 307 and object orientation 308.

In an embodiment, the workflow of the disclosed multitask deep neural network 304 includes two stages: offline training and online inference. The offline training is performed with a large set of manually annotated training data. During training, the multitask deep neural network 304 receives as input: (i) the input image 303; (ii) ground truth bounding boxes for each target; (iii) class labels for each target; and (iv) attribute labels for each target. After training, and in an embodiment, the parameterized multitask deep neural network 304 model is saved as a binary file and deployed to one or more cameras for real-time online inference. During the online inference stage, multitask deep neural network 304 receives the input image 303 and outputs the high-level semantic inferences 305-307 on the input image 303.

Network Architecture Design: Network Trunk

Figure 4:
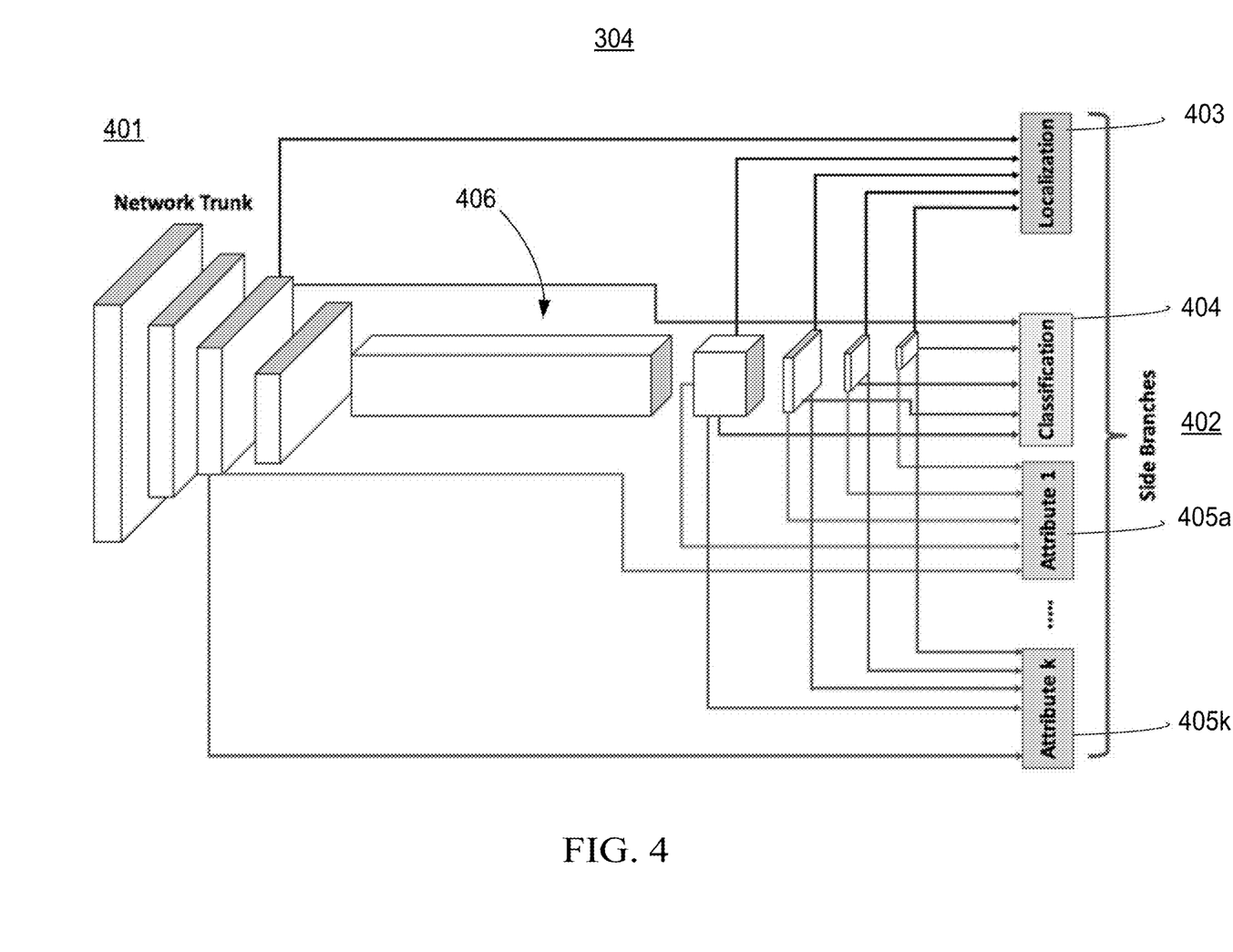
FIG. 4 illustrates an example neural network architecture, according to an embodiment.

FIG. 4 illustrates an example multitask deep neural network 304, according to an embodiment. Multitask deep neural network 304 includes network trunk 401 and side branches 402. The building blocks 406 of multitask deep neural network 304, hereinafter all referred to as "layers," perform operations of convolution, pooling or non-linear activation. Given the computational efficiency of these operations, multitask deep neural network 304 is able to achieve fast inference speed on the camera.

The functionality of the network trunk 401 is to encode the visual information of the input image 303 guided by the supervision information provided at each side branch of side branches 402 during training of multitask deep neural network 304. As the input image 303 goes through the layers of the network trunk 401, spatial resolution of the input image 303 decreases progressively, and produces a set of intermediate feature maps of different spatial sizes. Each of these feature maps summarizes the salient visual patterns in the raw input image 303, and can be utilized as a middle-level feature representation for inferring the high-level semantic inferences 305-307. Multiple feature maps of different sizes are chosen as the feature representations, which allows multitask deep neural network 304 to achieve scale-invariant inferences.

In an embodiment, the design principle of network trunk 401 is to use small convolutional kernels and keep the number of convolutional layers less than N (e.g., N<20). This ensures that the total amount of parameters is relatively small, so that the number of arithmetic operations for each inference can be limited to a reasonable range to achieve higher scalability, performance and energy efficiency. In practice, the following example network architectures could be employed as the network trunk 401: (i) lightweight network architectures such as "GoogLeNet" described in Christian Szegedy et al., "Going Deeper with Convolutions." In Proceedings of Computer Vision and Pattern Recognition (CVPR), 2015, "MobileNet" described in Andrew G. Howard et al., "MobileNets: Efficient Convolutional Neural Networks for Mobile Vision Applications." In Proceedings of Computer Vision and Pattern Recognition (CVPR), 2017, "SqueezeNet" described in Forrest N. Iandola et al., "SqueezeNet: AlexNet-level accuracy with 50× fewer parameters and <0.5 MB model size." In Proceeding of International Conference on Learning Representations (ICLR), 2016; and (ii) a customized network designed for different applications based on the principle of small convolutional kernel size and shadow network depth.

Network Architecture Design: Network Side Branches

Figure 5A:
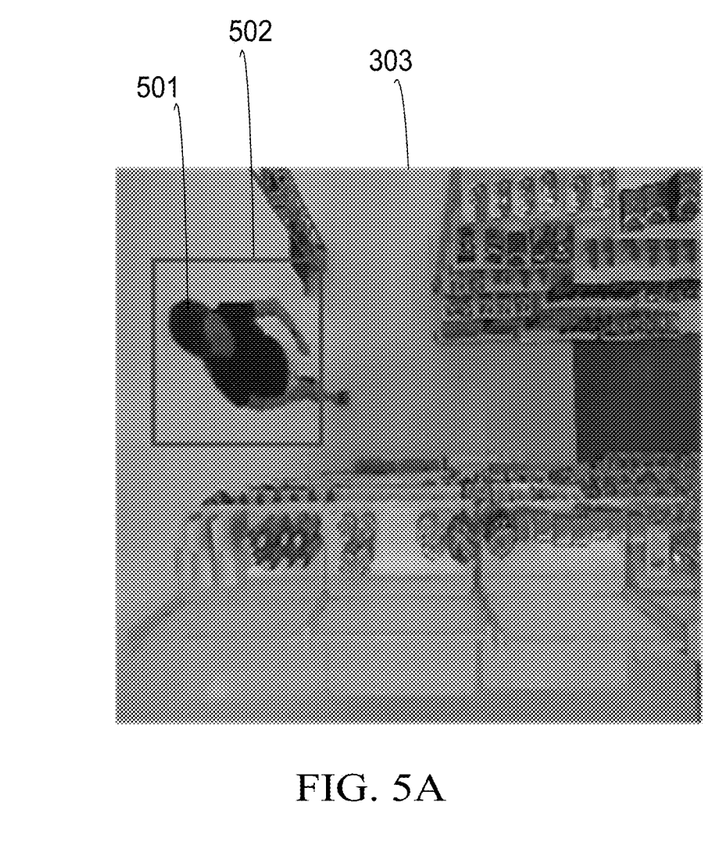
FIGS. 5A and 5B illustrate default anchor boxes and a ground truth box, respectively, on a 4×4 feature map, according to an embodiment.
Figure 5B:
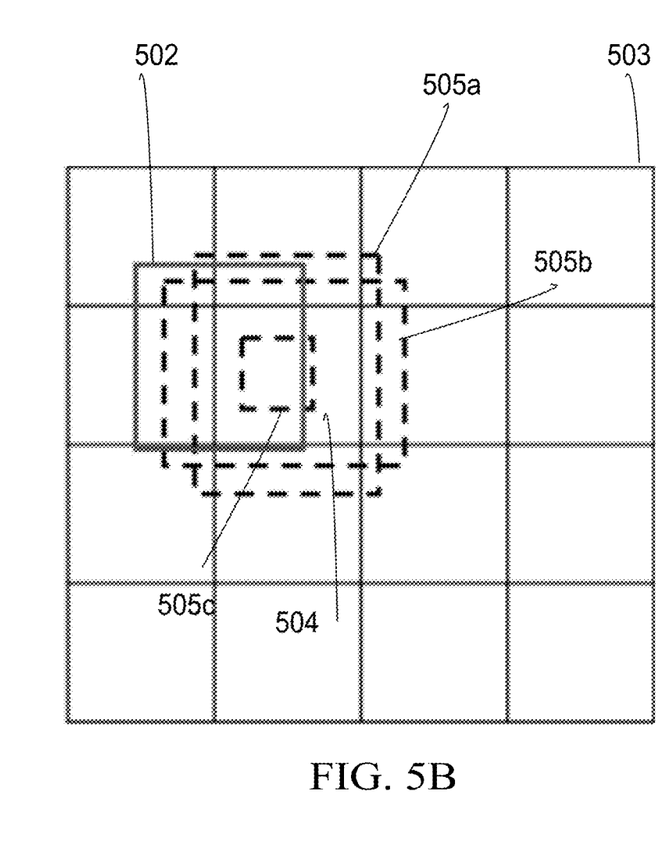

FIGS. 5A and 5B illustrate default anchor boxes 505a-505c and a ground truth box 502, respectively on a 4×4 feature map 503, according to an embodiment. Referring again to FIG. 4, the side branches 402 of the example multitask deep neural network 304 are used as predictors for different learning tasks in multitask deep neural network 304. Each side branch 403, 404, 405a-405k is connected to a fixed set of multi-scale feature maps for detecting targets of different sizes. In the example shown, the side branches 402 are classified into three different categories including bounding box regression branch 403 (for object localization), object classification branch 404 and attribute prediction branches 405a-405n. In other embodiments, more or fewer than three categories can be used depending on the application.

The bounding box regression branch 403 regresses the shape offsets of a set of predefined default anchor boxes with respect to a ground truth box. In general, on each feature map chosen from the network trunk 401, k default anchor boxes of different sizes and aspect ratios are tiled on each cell of the feature map, in which the position of each anchor box relative to its corresponding cell is fixed. In the example shown (where k=3, m=n=4), feature map 503 is a 4×4 feature map and anchor boxes 505a-505c are tiled on one cell 504 of the feature map 503 (the three boxes in black dash line). A 3×3×p small kernel is applied to produce the shape offset relative to the default box coordinates of the anchor boxes 505a-505c. For each anchor box 505a-505c at each cell of the feature map 503, 4 offsets relative to the original shape of anchor box 502 are computed. This results in a total of 12 convolutional filters applied around each cell in the feature map 503, yielding 192 outputs for the 4×4 feature map 503.

At training time, the 3 anchor boxes 505-505c are matched to the ground truth box 502 (the red box in red solid line) based on the overlap ratios of the box areas. The matched boxes are treated as positive data and the non-matched boxes are treated as negatives for learning the bounding box regression parameters. A localization objective function (e.g., a loss function) is placed at the end of the bounding box regression branch 403. We denote by vector $b=(b_x, b_y, b_w, b_h)$ the parameters for a bounding box in which the first two elements denote the coordinates of the box center and the last two elements denote the width and height of the box. The localization loss can be defined as a smooth L1 loss between the predicted box (p) and the ground truth box (g) parameters.

The classification branch 404 is responsible for producing the confidence scores of target classes for each of the k default anchor boxes. Similar to the localization branch 403, the classification branch 404 works in a convolutional manner on the multiscale feature maps. For a feature map of size m×n with p channels, the basic classifier in the form of network parameters is a 3×3×p small kernel that produces a confidence score for one semantic category. In the example shown, for each of the k default anchor boxes tiled at each cell of the feature map, the confidence scores for c semantic categories are computed. This results in a total of ck convolutional filters that are applied around each cell in the feature map 503, and yields ckmn output confidence scores for the k default anchor boxes tiled on the m×n feature map.

After generating confidence scores on all of the feature maps, the confidence scores are concatenated together as the overall confidence score for all default boxes. A confidence score objective function (e.g., a loss function) is placed at the end of the target classification branch 404, which can be defined as any L2 loss or cross entropy loss commonly applied in deep network optimization.

The attribute prediction branches 405a-405k are branches for predicting the attribute labels of the targets. For example, after a "person" target is correctly localized and classified, one may be interested to further predict the direction the person is facing (the orientation of the person). This can be accomplished by defining a set of orientation attribute labels 310 (e.g., uniformly quantizing 360 degrees into 8 bins), followed by learning classifiers for each of them. Moreover, since the attributes for some applications could be multifaceted (e.g., besides the orientation, one may also want to predict the age or gender of the person), the attribute prediction branches 405a-405k allow multiple parallel pathways to be incorporated, each corresponding to one specific attribute prediction task. Each attribute prediction pathway is realized in a similar way as the object classification branch 308, i.e., predicting the confidence scores for each attribute label with a 3×3×p convolutional kernels applied on the multiscale feature maps, and concatenating all predictions in the end. An attribute confidence score loss function in the form of L2 loss or cross entropy loss is placed at the end of each attribute branches 405a-405k.

Network Optimization

In an embodiment, the overall objective function loss function of multitask deep neural network 304 is a weighted sum of localization loss, classification loss and attribute prediction loss. In the training stage, the weights of the entire network 304 can be optimized to minimize the overall objective function. Backpropagation, an abbreviation for "backward propagation of errors," can be used in conjunction with the stochastic gradient descent method to train multitask deep neural network 304.

Example Applications

Multitask deep neural network 304 described above can be used as a foundational element of intelligent video analytics in retail stores. The efficient nature of the network 304 allows it to run in real-time on inexpensive embedded devices located within the retail store, such as a camera or a small appliance. Besides the cost savings of not requiring expensive servers or other equipment to perform the analysis, the fact that all video is analyzed within the store addresses concerns around store bandwidth usage and shopper privacy that arise when using cloud-based neural networks. Multitask deep neural network 304 has several potential applications in retail, a few of which are listed below.

Shopper Activity Detection

While there are solutions for anonymously tracking the movement of shoppers through a store, there are really no scalable, low-cost solutions that go beyond just detecting movement to also detecting shopper behavior. Multitask deep neural network 304 can localize shoppers in the store and classify their actions or activities based on prior training data. Examples of shopper activities that are of interest to retailers include shoppers reaching into a shelf to pick up a product, examining a product after picking it up, or trying on a product such as a jacket, a headphone or a shoe. Such data can be used to improve the shopper experience or help the retailer to understand why a specific product is not selling well.

Employee Activity Detection

In addition to shopper activity detection, employee activities can also be of interest to retailers. For examples, retailers may want to know when employees are assisting customers, whether they are restocking shelves as items go out of stock, re-organizing displays when they get cluttered or cleaning the store as per schedule.

Theft Detection ("Loss Prevention")

Retail loss prevention teams struggle to stay on top of theft within their stores. The multitask deep neural network 304 can be trained to recognize suspicious actions such as sweeping of large quantities of products off a shelf, hiding of products underneath clothing, etc., and immediately alert in-store personnel when such behavior is detected. Multitask deep neural network 304 can also tag the relevant segments of video for subsequent examination and use as evidence.

Shopper Demographics Detection

Shopper demographic data is of significant interest to retail marketing and merchandising teams. Knowing the age, gender and ethnicity of shoppers visiting their stores helps retailers adjust their marketing and product mix to better suit the demographics of their shoppers. Multitask deep neural network 304 can be utilized to accurately and in real-time detect human faces as well as correctly classify them into the correct age, gender and ethnicity.

Automatic Checkout

The retail store of the future will provide shoppers with the convenience of simply picking up the items they want and walking out of the store, completely eliminating the hassle of waiting in line to check out products or fumbling with credit cards, etc., to make a payment. Multitask deep neural network 304 can power such next generation checkout experiences. The multitask deep neural network 304 can be trained to detect and track the movement of a shopper in the store, know when the shopper has picked up a product, and identify what the product is so it can be added to the shopper's virtual cart for automatic checkout as the shopper leaves the store.

Example Process

Figure 6:
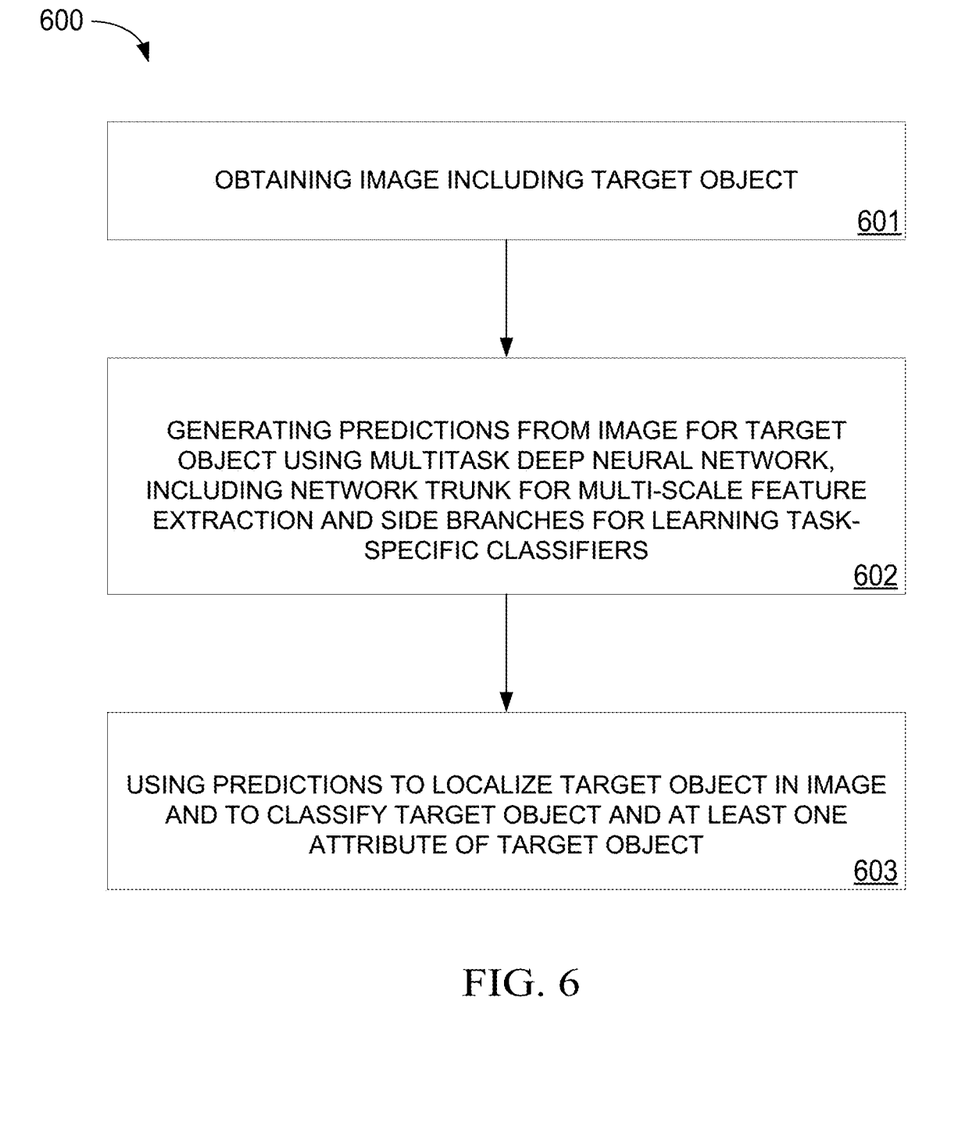
FIG. 6 is a flow diagram of a process for simultaneous object localization and attribute classification using multitask deep neural networks, according to an embodiment.

FIG. 6 is a flow diagram of a process 600 for simultaneous object localization and attribute classification using multitask deep neural networks, according to an embodiment. Process 600 can be implemented by, for example, the server architecture 700 described in reference to FIG. 7.

Process 600 begins by obtaining an image from an image capture device in an environment that includes a target object (601). For example, the image capture device can be a monocular or stereo camera.

Process 600 continues by generating predictions from the image for the target object using a multitask deep neural network (602). In an embodiment, the multitask deep neural network includes a network trunk and side branches. The network trunk is configured for multi-scale feature extraction guided by supervision information provided by the side branches during training of the multitask deep neural network. The side branches are configured as learning task-specific classifiers.

Process 600 continues by using the predictions to localize the target object in the environment and to classify the target object and at least one attribute of the target object (603).

In an embodiment, a retail computing platform includes an image capture device (e.g., stereo camera); a database and a retail analytics processing circuit (e.g., computer, embedded processor in the image capture device) coupled to the image capture device. The processing circuit is configured to obtain an image of a shopping environment (e.g., a retail store) from the image capture device that includes a target object and generate predictions from the image for the target object using a multitask deep neural network, as previously described above. The multitask deep neural network includes a network trunk and side branches. The network trunk is configured for multi-scale feature extraction guided by supervision information provided by the side branches during training of the multitask deep neural network. The side branches are configured as learning task-specific classifiers.

The system uses the predictions to determine the location of the target object in the shopping environment, to classify the target object as a customer (e.g., a shopper) or employee, and to classify at least one attribute (e.g., an action performed by the shopper) of the customer or employee. The system uses the location to track the customer or employee in the shopping environment and to determine if the attribute is indicative of a pattern of behavior (e.g., shoplifting, fraudulent behavior) of the customer or employee in the shopping environment. In accordance with the attribute being indicative of a pattern of behavior of the customer or employee in the shopping environment, the system updates one or more records in the database that are related to the customer or employee.

In an embodiment, the system further includes an analytics circuit that calculates statistical parameters (e.g., averages, medians, variances, standard deviations, quantiles) of various business activities (e.g., transactions) to identify patterns in data (e.g., patterns in transactions and video data). The analytics circuit generates employee or customer profiles, perform time-series analysis of time-dependent data, perform clustering and classification to discover patterns and associations among groups of data, apply matching algorithms to detect anomalies in the behavior of transactions. The discovered data patterns and associations can be used for a variety of business purposes, including but not limited to: improving sales, marketing and customer service. In an embodiment, the discovered data patterns and associations can also be used to detect certain types of fraud at the POS, such as fraudulent refund transactions.

Example System Architecture

Figure 7:
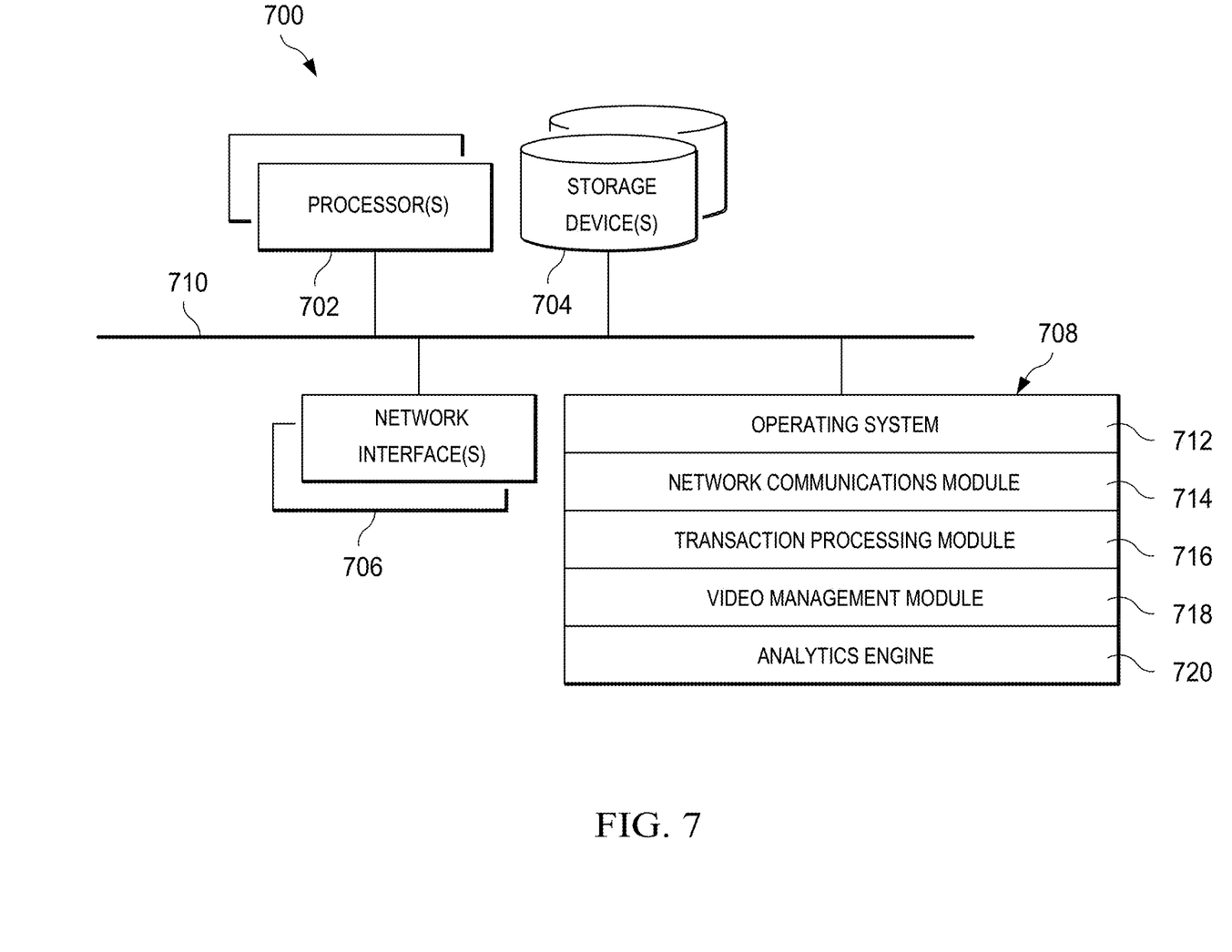
FIG. 7 is a block diagram of a system architecture for implementing the embodiments described in reference to FIGS. 1-6.

FIG. 7 is a block diagram of example server architecture 700 for implementing the features and processes described in reference to FIGS. 1-6, according to an embodiment. Other architectures are possible, including architectures with more or fewer components. In some implementations, architecture 700 includes one or more processor(s) 702 (e.g., dual-core Intel® Xeon® Processors), one or more network interface(s) 706, one or more storage device(s) 704 (e.g., hard disk, optical disk, flash memory) and one or more non-transitory, computer-readable storage medium(s) 708 (e.g., hard disk, optical disk, flash memory, etc.). These components can exchange communications and data over one or more communication channel(s) 710 (e.g., buses), which can utilize various hardware and software for facilitating the transfer of data and control signals between components.

The term "non-transitory, computer-readable storage medium" refers to any medium that participates in providing instructions to processor(s) 702 for execution, including without limitation, non-volatile media (e.g., optical or magnetic disks) and volatile media (e.g., memory).

Non-transitory, computer-readable storage medium(s) 708 can further include operating system 712 (e.g., Mac OS® server, Windows® NT server), network communication module 714, transaction processing module 616, video management system 718 and analytics engine 720. Operating system 712 can be multi-user, multiprocessing, multi-tasking, multithreading, real time, etc. Operating system 712 performs basic tasks, including but not limited to: recognizing input from and providing output to devices 702, 704, 708 and 708; keeping track and managing files and directories on non-transitory, computer-readable storage medium(s) 708 (e.g., memory or a storage device); controlling peripheral devices; and managing traffic on the one or more communication channel(s) 710. Network communications module 714 includes various components for establishing and maintaining network connections (e.g., software for implementing communication protocols, such as TCP/IP, HTTP, etc.). Transaction processing module 716, video management system 718 and analytics engine 720 are described in reference to FIGS. 1-6. In an embodiment, analytics engine 720 implements the one-shot, multitask deep neural network 304, described in reference to FIGS. 3-6.

Architecture 700 can be included in any computer device, including one or more server computers in a local or distributed network each having one or more processing cores. Architecture 700 can be implemented in a parallel processing or peer-to-peer infrastructure or on a single device with one or more processors. Software can include multiple software components or can be a single body of code.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
obtaining, by a processing circuit, an image from an image capture device in a shopping environment, the image including a target object and at least one other object in the shopping environment;
generating, by the processing circuit, predictions from the image for the target object using a multitask deep neural network, the multitask deep neural network including a network trunk and side branches, the network trunk configured for multi-scale feature extraction guided by supervision information provided by the side branches during training of the multitask deep neural network, the side branches including at least a target object classification branch configured to predict a class of the target object, a target object localization branch configured to predict a location of the target object in the shopping environment and a target attribute prediction branch configured to predict at least one target attribute associated with a pattern of behavior of the target object with respect to the at least one other object at the predicted location; and
using, by the processing circuit, the predictions to localize the target object in the environment, identify the target object, and detect the pattern of behavior of the identified target object relative to the at least one other object at the location in the shopping environment.

2. The method of claim 1, wherein the image is taken from a camera in a retail environment, the target object is classified as a shopper and the pattern of behavior of the shopper in the shopping environment is theft of the at least one other object.

3. The method of claim 1, wherein the side branches are connected to multi-scale feature maps for detecting target objects of different sizes.

4. The method of claim 1, where the multitask deep neural network predicts multifaceted attribute labels for the target object.

5. The method of claim 1, wherein the multitask deep neural network is a single feedforward neural network.

6. The method of claim 1, wherein the multitask deep neural network implements a multitask objective function for joint many-task optimization.

7. The method of claim 6, wherein the multitask objective function is a loss function that includes a weighted sum of localization loss, classification loss and attribute prediction loss.

8. The method of claim 1, wherein the bounding box regression branch regresses shape offsets of a set of pre-defined default anchor boxes with respect to a ground truth box, and default anchor boxes of different sizes and aspect ratios are tiled on each cell of a feature map provided by the network trunk, and wherein the position of each anchor box relative to its corresponding cell is fixed.

9. The method of claim 8, wherein the classification branch produces confidence scores of target object classes for each of the default anchor boxes.

10. A system comprising:
one or more processors;
memory storing instructions that when executed by the one or more processors, cause the one or more processors to perform operations comprising:
obtaining an image from an image capture device in a shopping environment, the image including a target object and at least one other object in the shopping environment;
generating predictions from the image for the target object using a multitask deep neural network, the multitask deep neural network including a network trunk and side branches, the network trunk configured for multi-scale feature extraction guided by supervision information provided by the side branches during training of the multitask deep neural network, the side branches including at least a target object classification branch configured to predict a class of the target object, a target object localization branch configured to predict a location of the target object in the shopping environment and a target attribute prediction branch configured to predict at least one target attribute associated with a pattern of behavior of the target object relative to the at least one other object at the predicted; and
using the predictions to localize the target object in the shopping environment, identify the target object, and detect the pattern of behavior behaviour of the target object relative to the at least one other object at the location in the shopping environment.

11. The system of claim 10, wherein the image is taken from a camera in shopping environment, the target object is classified as a shopper and the pattern of behavior of the shopper in the shopping environment is theft of the at least one other object.

12. The system of claim 10, wherein the side branches are connected to multi-scale feature maps for detecting target objects of different sizes.

13. The system of claim 10, where the multitask deep neural network predicts multifaceted attribute labels for the target object.

14. The system of claim 10, wherein the multitask deep neural network is a single feedforward neural network.

15. The system of claim 10, wherein the multitask deep neural network implements a multitask objective function for joint many-task optimization.

16. The system of claim 15, wherein the multitask objective function is a loss function that includes a weighted sum of localization loss, classification loss and attribute prediction loss.

17. The system of claim 10, wherein the bounding box regression branch regresses shape offsets of a set of pre-defined default anchor boxes with respect to a ground truth box, and default anchor boxes of different sizes and aspect ratios are tiled on each cell of a feature map provided by the network trunk, and wherein the position of each anchor box relative to its corresponding cell is fixed.

18. The system of claim 17, wherein the classification branch produce confidence scores of target object classes for each of the default anchor boxes.

19. A system comprising:
an image capture device;
a database;
a retail analytics processing circuit coupled to the image capture device, the processing circuit configured to:
obtain, from the image capture device, an image of a shopping environment, the image including a target object and at least one other object;
generate predictions from the image for the target object using a multitask deep neural network, the multitask deep neural network including a network trunk and side branches, the network trunk configured for multi-scale feature extraction guided by supervision information provided by the side branches during training of the multitask deep neural network, the side branches including at least a target object classification branch configured to predict a class of the target object, a target object localization branch configured to predict a location of the target object in the shopping environment and a target attribute prediction branch configured to predict at least one target attribute associated with a behavior of the target object relative to the at least one other object at the predicted location;

use the predictions to determine the location of the target object in the shopping environment, identify the target object as a customer or employee, and detect the pattern of behavior of the identified customer or employee relative to the at least one other object at the predicted location in the shopping environment; and update one or more records in the database that are related to the customer or employee.

20. The method of claim 1, wherein the image is taken from a camera in a retail environment and the target object is classified based on demographics.

21. The system of claim 10, wherein the image is taken from a camera in a retail environment and the target object is classified based on demographics.

22. The system of claim 19, wherein the image is taken from a camera in a retail environment and the target object is classified based on demographics.

23. The method of claim 1, wherein the image is taken from a camera in a retail environment and the target object is classified as standing, sitting or reaching.

24. The system of claim 10, wherein the image is taken from a camera in a retail environment and the target object is classified as standing, sitting or reaching.

25. The system of claim 19, wherein the image is taken from a camera in a retail environment and the target object is classified as standing, sitting or reaching.

* * * * *

UNITED STATES PATENT AND TRADEMARK OFFICE
CERTIFICATE OF CORRECTION

PATENT NO. : 11,087,130 B2  
APPLICATION NO. : 16/233030  
DATED : August 10, 2021  
INVENTOR(S) : Liu et al.

Page 1 of 1

It is certified that error appears in the above-identified patent and that said Letters Patent is hereby corrected as shown below:

In the Claims

Column 14, Line 20, in Claim 10 delete "predicted;" and insert --predicted location;--

Column 14, Line 23, in Claim 10 after "behavior" delete "behaviour"

Signed and Sealed this  
Fifteenth Day of March, 2022

Drew Hirshfeld  
*Performing the Functions and Duties of the*  
*Under Secretary of Commerce for Intellectual Property and*  
*Director of the United States Patent and Trademark Office*